US012548268B2

(12) United States Patent
Ha

(10) Patent No.: US 12,548,268 B2
(45) Date of Patent: *Feb. 10, 2026

(54) PROCESSING METHOD AND APPARATUS WITH LIGHT ATTENUATION COMPENSATION FOR AUGMENTED REALITY DEVICES

(71) Applicant: SAMSUNG ELECTRONICS CO., LTD., Suwon-si (KR)

(72) Inventor: Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,251

(22) Filed: Jan. 2, 2024

(65) Prior Publication Data
US 2024/0135657 A1    Apr. 25, 2024

Related U.S. Application Data

(63) Continuation of application No. 17/836,516, filed on Jun. 9, 2022, now Pat. No. 11,900,553.

(30) Foreign Application Priority Data

Dec. 31, 2021  (KR) .................. 10-2021-0194242

(51) Int. Cl.
G06T 19/00    (2011.01)
G06T 15/00    (2011.01)
(Continued)

(52) U.S. Cl.
CPC .......... *G06T 19/006* (2013.01); *G06T 15/005* (2013.01); *G06T 15/60* (2013.01); *G06T 15/80* (2013.01)

(58) Field of Classification Search
CPC ....... G06T 15/005; G06T 15/60; G06T 15/80; G06T 19/006; G06T 2215/16
(Continued)

(56) References Cited

U.S. PATENT DOCUMENTS 9,417,452 B2  8/2016  Schowengerdt et al.
9,652,892 B2  5/2017  Tomlin et al.
(Continued)

FOREIGN PATENT DOCUMENTS

CN    109074680 A    12/2018
CN    112506797 A    3/2021
(Continued)

OTHER PUBLICATIONS

Ying Tang et al., ALCC-Glasses: Arriving Light Chroma Controllable Optical See-Through Head-Mounted Display System for Color Vision Deficiency Compensation, Appl. Sci., 2020, 10, 2381; http://doi.org/10.3390/app10072381, Mar. 2020, pp. 1-16.*
(Continued)

Primary Examiner — Jacinta M Crawford
(74) Attorney, Agent, or Firm — NSIP Law

(57) ABSTRACT

A method and apparatus for processing augmented reality (AR) including determining a compensation parameter to compensate for light attenuation of visual information caused by a display area of an AR device as the visual information corresponding to a target scene is displayed through the display area, generating a background image without the light attenuation by capturing the target scene using a camera of the AR device, generating a compensation image by reducing brightness of the background image using the compensation parameter, generating a virtual object image to be overlaid on the target scene, generating
(Continued)

a display image by synthesizing the compensation image and the virtual object image, and displaying the display image in the display area.

19 Claims, 11 Drawing Sheets

(51) Int. Cl.
   *G06T 15/60* (2006.01)
   *G06T 15/80* (2011.01)
(58) Field of Classification Search
   USPC .......................................................... 345/633
   See application file for complete search history.

(56) References Cited

U.S. PATENT DOCUMENTS

| | | |
|---|---|---|
| 9,791,700 B2 | 10/2017 | Schowengerdt |
| 10,847,117 B1 | 11/2020 | Rhodes, Jr. et al. |
| 10,862,930 B2 | 12/2020 | Miller |
| 10,937,229 B2 | 3/2021 | Kunkel et al. |
| 11,024,256 B2 | 6/2021 | Walters et al. |
| 11,423,621 B1 | 8/2022 | Atlas et al. |
| 2017/0109931 A1 | 4/2017 | Knorr et al. |
| 2017/0270707 A1 | 9/2017 | Kass |
| 2017/0301145 A1 | 10/2017 | Miller |
| 2020/0193652 A1 | 6/2020 | Hoffman et al. |
| 2020/0233232 A1 | 7/2020 | Macnamara |
| 2021/0141229 A1* | 5/2021 | Mathur ................. G02F 1/1313 |

FOREIGN PATENT DOCUMENTS

| | | |
|---|---|---|
| KR | 10-1873839 B1 | 7/2018 |
| KR | 10-2019-0136262 A | 12/2019 |
| KR | 10-2020-0095985 A | 8/2020 |

OTHER PUBLICATIONS

Yuta Itoh et al., Light Attenuation Display: Subtractive See-Through Near Eye Display via Spatial Color Filtering, IEEE Transactions on Visualization and Computer Graphics, vol. 25, No. 5, May 2019, pp. 1951-1960.*

Ying Ting et al., Arriving Light Control for Color Vision Deficiency Compensation Using Optical See-Through Head-Mounted Display , VRCAI '18: Proceedings of the 16th ACM SIGGRAPH International Conference on Virtual Reality Continuum and its Applications in Industry, Article No. 6, Dec. 2018, pp. 1-6.*

Shohei Mori et al., BrightView: Increasing Perceived Brightness of Optical See-Through Head-Mounted Displays Through Unnoticeable Incident Light Reduction, 2018 IEEE Conference on Virtual Reality and 3D User Interfaces (VR), Tuebingen/Reutlingen, Germany, Mar. 2018, pp. 251-258.*

Pratt, William K. "Digital Image Processing: PIKS Inside, Third Edition, Chapter 10 Image Enhancement", XP-002407529, John Wiley & Sons, Inc., 2001, pp. 243-296.

Knecht, Martin, et al. "Differential Instant Radiosity for Mixed Reality." 2010 IEEE international symposium on mixed and augmented reality. IEEE, 2010, pp. 99-107.

Debevec, Paul. "Rendering Synthetic Objects into Real Scenes: Bridging Traditional and Image-Based Graphics with Global Illumination and High Dynamic Range Photography." ACM SIGGRAPH 2008 classes. 2008. pp. 1-10.

Extended European search report issued on May 22, 2023, in counterpart European Patent Application No. 22190811.4 (13 pages in English).

* cited by examiner

PROCESSING METHOD AND APPARATUS WITH LIGHT ATTENUATION COMPENSATION FOR AUGMENTED REALITY DEVICES

CROSS-REFERENCE TO RELATED APPLICATIONS

This application is a Continuation Application of U.S. patent application Ser. No. 17/836,516 filed on Jun. 9, 2022, which claims the benefit under 35 USC § 119(a) of Korean Patent Application No. 10-2021-0194242, filed on Dec. 31, 2021, in the Korean Intellectual Property Office, the entire disclosure of which is incorporated herein by reference for all purposes.

BACKGROUND

1. Field

The following description relates to a method and apparatus for processing augmented reality (AR).

2. Description of Related Art

Augmented reality (AR) may overlay a virtual image having additional information on a real world object or scene that is being viewed by a user. The virtual image may include content related to a real object in the real world, and the user may acquire the additional information about the real world through the additional content. In an example, AR may be provided through a device in a form of glasses, goggles, or a head mounted display (HMD). An AR device may express a virtual image through a projective addition technique on a transparent or translucent display where the real-world background is reflected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method with augmented reality (AR) processing, the method including determining a compensation parameter to compensate for light attenuation of visual information caused by a display area of an AR device as the visual information corresponding to a target scene is displayed through the display area, generating a background image without the light attenuation by capturing the target scene using a camera of the AR device, generating a compensation image by reducing brightness of the background image using the compensation parameter, generating a virtual object image to be overlaid on the target scene, generating a display image by synthesizing the compensation image and the virtual object image, and displaying the display image in the display area.

The virtual object image may include an attenuation area that expresses dark colors using the light attenuation.

The attenuation area of the virtual object image may be expressed with at least a part of the light attenuation caused by the display area remaining therein.

The attenuation area of the virtual object image may include any one or any combination of a shadow, a black pupil, and black hair in the virtual object image.

The generating of the display image may include determining a corresponding area of the attenuation area of the virtual object image in the compensation image, and expressing the corresponding area by subtracting a pixel value of the corresponding area based on a pixel value of the attenuation area.

The expressing of the corresponding area may include expressing a darkest color among the dark colors by reducing a compensation value of the corresponding area to "0".

The virtual object image may include an object element and a shadow element, and the generating of the virtual object image may include generating the object element by fusing the background image and an initial virtual object element, generating the shadow element based on a difference between the background image and an intermediate result image, and generating the virtual object image by fusing the object element and the shadow element.

The generating of the virtual object image may further include generating a mask image comprising a mask corresponding to the initial virtual object element, and the generating of the object element may include generating the intermediate result image comprising the object element by fusing the background image and the initial virtual object element, and extracting the object element from the intermediate result image using an inner area of the mask in the mask image.

The generating of the virtual object image may further include generating a mask image comprising a mask corresponding to the initial virtual object element, and the generating of the shadow element may include generating a difference image corresponding to a difference between the background image and the intermediate result image, and extracting the shadow element from the difference image using an outer area of the mask in the mask image.

The method may include adjusting the compensation image so that the compensation image and the target scene are observed in a matched state.

The adjusting of the compensation image may include determining a target depth from the AR device to a target area of the compensation image, determining calibration information based on a difference between a capture viewpoint of the camera and an observation viewpoint of an user, determining conversion information to convert an image at the capture viewpoint for the target area into an image at the observation viewpoint based on the target depth and the calibration information, and adjusting the compensation image using the conversion information.

The determining of the target depth may include obtaining object position information of the virtual object image to be displayed in the target scene, and determining the target depth based on the object position information.

The determining of the target depth may further include determining target plane information by estimating a target plane corresponding to the target area, and determining the target depth based on the target plane information.

The determining of the target depth may further include determining target space information by estimating space information corresponding to the target area, and determining the target depth based on the target space information.

In another general aspect, there is provided an augmented reality (AR) processing apparatus including a processor configured to determine a compensation parameter to compensate for light attenuation of visual information caused by a display area of the AR processing apparatus as the visual information corresponding to a target scene is displayed through the display area, generate a background image without the light attenuation by capturing the target scene using a camera of the AR processing apparatus, generate a compensation image by reducing brightness of the background image using the compensation parameter, generate a virtual object image to be overlaid on the target scene, generate a display image by synthesizing the compensation image and the virtual object image, and display the display image in the display area.

The virtual object image may include an attenuation area that expresses dark colors using the light attenuation, and the attenuation area may be expressed with at least a part of the light attenuation caused by the display area remaining therein.

The processor may be configured to determine a corresponding area of the attenuation area of the virtual object image in the compensation image, and express the corresponding area by subtracting a pixel value of the corresponding area based on a pixel value of the attenuation area.

In another general aspect, there is provided an augmented reality (AR) device including a camera configured to capture a target scene, a processor configured to determine a compensation parameter to compensate for light attenuation of visual information caused by a display area of a display as the visual information corresponding to the target scene is provided through the display area, generate a background image without the light attenuation by capturing the target scene using the camera, generate a compensation image by reducing brightness of the background image using the compensation parameter, generate a virtual object image to be overlaid on the target scene, and generate the display image by synthesizing the compensation image and the virtual object image, and the display configured to display the display image in the display area.

The virtual object image may include an attenuation area that expresses dark colors using the light attenuation, and the processor may be configured to determine a corresponding area of the attenuation area of the virtual object image in the compensation image, and express the corresponding area by subtracting a pixel value of the corresponding area based on a pixel value of the attenuation area.

In another general aspect, there is provided an augmented reality (AR) glasses including a processor configured to determine a compensation parameter to compensate for light attenuation of visual information caused by lenses of the AR glasses as the visual information corresponding to a target scene is displayed through the lenses, generate a background image without the light attenuation by capturing the target scene using a camera of the AR glasses, generate a compensation image by reducing brightness of the background image using the compensation parameter, generate a virtual object image to be overlaid on the target scene, generate a display image by synthesizing the compensation image and the virtual object image, and at least one projector configured to project the display image on the lenses.

The at least one projector may include two projectors, each disposed in respective temple of the AR glasses, and each projector being configured to project the display image on a lens of the lenses.

The camera may be disposed in a bridge of the AR glasses, and the processor may be configured to determine a target depth from the AR glasses to a target area of the compensation image, determine calibration information based on a difference between a capture viewpoint of the camera and an observation viewpoint of the lenses, convert an image at the capture viewpoint for the target area into an image at the observation viewpoint based on the target depth and the calibration information, and adjust the compensation image based on the conversion information.

The virtual object may include a lighting effect and a shadow of the virtual object.

Other features and aspects will be apparent from the following detailed description, the drawings, and the claims.

Figure 1:
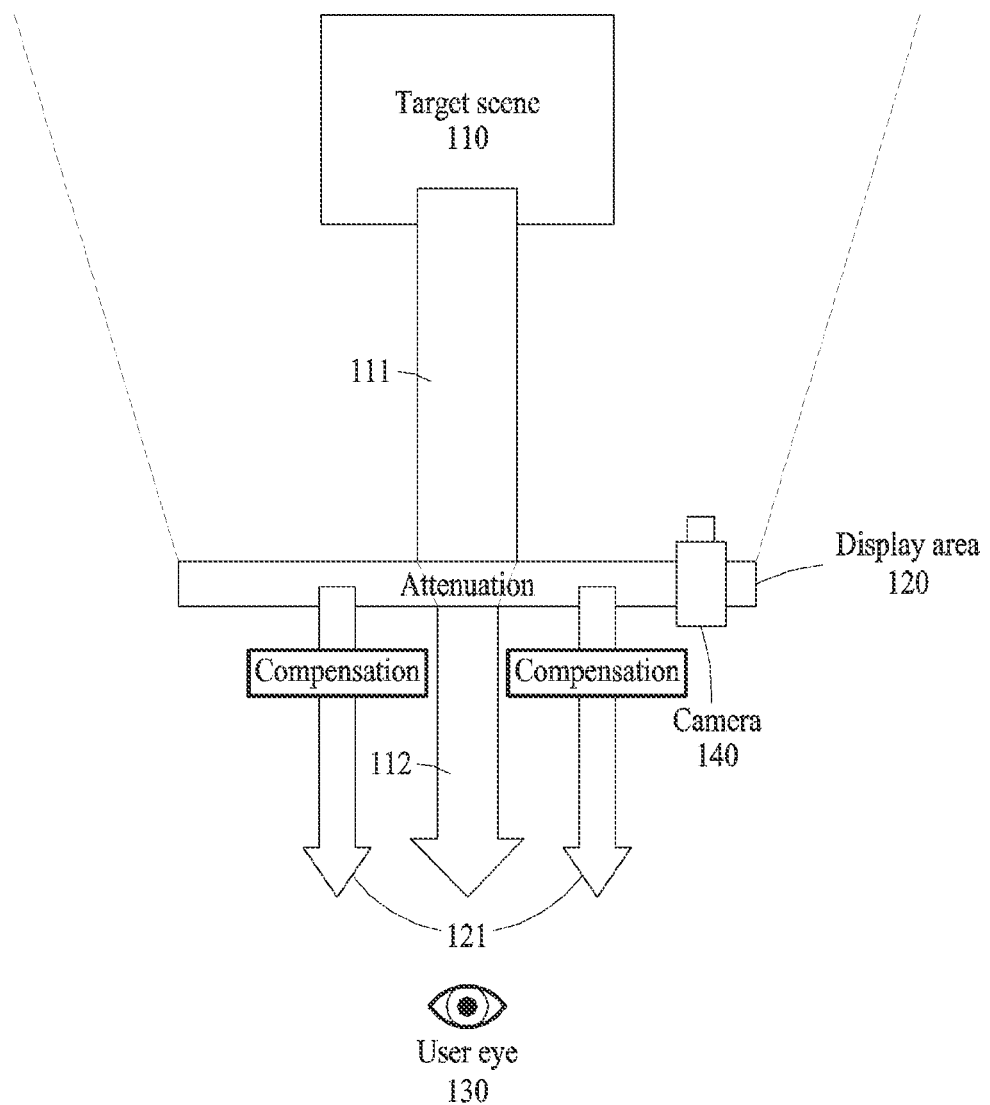
FIG. 1 illustrates an example of processing augmented reality (AR) using light attenuation.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third,", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of processing augmented reality (AR) using light attenuation. Referring to FIG. 1, visual information 111 corresponding to a target scene 110 in a real world may be provided through a display area 120 of an AR device (e.g., an AR device 1000 of FIG. 10) to a user eye 130. The visual information 111 may correspond to light. Attenuation may be caused by the display area 120 in the light corresponding to the visual information 111, and accordingly the visual information 111 may weaken to visual information 112, which is perceived by the eyes of the user 130. Here, the attenuation may further include other phenomena (e.g., scattering, reflection, etc.) that weaken the light, or the attenuation may be replaced with at least some of the phenomena. For example, the display area 120 may include a translucent element that blocks at least a part of the light, and light attenuation may occur as remaining unblocked light passes through the display area 120. In an example, the display area 120 may be a translucent lens that provides a virtual image through a reflection function or a translucent display that displays the virtual image through a display element.

An AR processing apparatus may use the light attenuation to express dark colors (e.g., a shadow, a black pupil, black hair, etc.). In an example, the AR processing apparatus may use a projective addition technique to express the virtual image, but the projection addition technique may be unable to adequately express colors that are darker than those of an actual background. Since the light attenuation darkens the actual background, darkness corresponding to a degree of the attenuation may be expressed by selecting a state of the attenuation. In an example, expression of the dark colors may be needed for realistic rendering. In particular, a shadow or shading may have a great effect on realism of the virtual image.

The AR processing apparatus determines a compensation parameter that compensates for the light attenuation. According to an example, the compensation parameter may be determined based on transmittance of the display area 120. For example, if the transmittance of the display area 120 is 80%, a parameter value that compensates for the attenuated light of 20% may be determined. According to another example, the compensation parameter may be determined according to a user setting. The user wearing the AR device may adjust the compensation parameter while looking at the real world through the display area 120, and the compensation parameter may be determined according to user choice. For example, a parameter value that provides compensation for the user to think that a state is most similar to the real world may be selected. In another example, a parameter value suitable for illuminance (e.g., a light level as dark as wearing sunglasses) that the user prefers may be selected. In an example, the user setting may be set through a calibration process that is performed when the AR device is initially used.

The AR processing apparatus may provide visual information 121 that compensates for the visual information 112 in a weakened state. The visual information 121 may be provided by a display image of the display area 120. The display image may be generated based on a compensation image and a virtual object image. The compensation image may compensate for the light attenuation. For example, if light of 20% is attenuated by the display area 120, the compensation image compensates for the light of 20% so that a scene at the level of the real world may be provided to the user eye 130. The AR processing apparatus may generate a background image without the light attenuation by capturing the target scene in the real world using a camera 140 of the AR device. The AR processing apparatus may generate the compensation image that compensates for the light attenuation by reducing brightness of the background image using the compensation parameter. The AR processing apparatus may generate the virtual object image to be overlaid on the target scene, generate the display image by synthesizing the compensation image and the virtual object image, and display the display image in the display area 120.

The virtual object image may include an attenuation area that expresses the dark colors using the light attenuation. The attenuation area may be expressed with at least a part of the light attenuation caused by the display area 120 remaining therein. For example, the attenuation area may include a shadow element of the virtual object image. The AR processing apparatus may determine a corresponding area of the attenuation area of the virtual object image in the compensation image, and express the corresponding area by subtracting a pixel value of the corresponding area based on a pixel value of the attenuation area. The AR processing apparatus may express a darkest color among the dark colors by reducing a compensation value of the corresponding area to "0". For example, if light of 20% is attenuated by the display area 120, a compensation value for the light of 10% may express a less dark color than a compensation value for the light of 5%. A compensation value of "0" may express the darkest color. In this way, the AR processing apparatus may express the dark colors such as a black pupil and dark hair in addition to the shadow element.

An expression range of the dark colors may be determined according to a degree of attenuation of the display area 120 and the compensation parameter. For example, if light of 20% is attenuated by the display area 120 and a compensation parameter value provides a range of the compensation value that may compensate for all the light of 20%, the dark colors may be expressed within an expression range corresponding to the light of 20% attenuated by the display 120. On the other hand, if light of 15% is attenuated by the display area 120 and the compensation parameter value provides a range of a compensation value that may compensate for all the light of 15%, or if light of 20% is attenuated by the display area 120 and the compensation parameter value provides a range of a compensation value that may only compensate for light of 10%, the expression range of the dark colors may vary.

Figure 2:
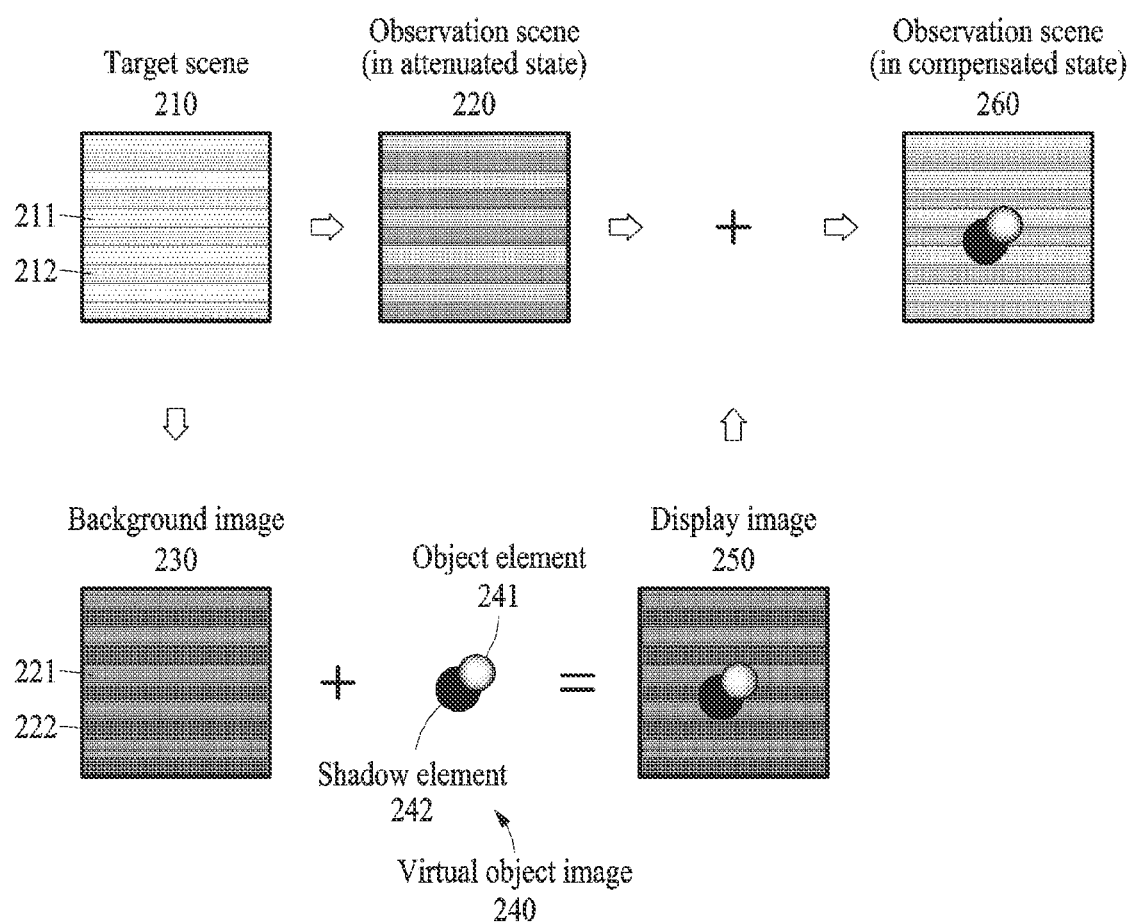
FIG. 2 illustrates an example of generating and applying a display image.

FIG. 2 illustrates an example of generating and applying a display image. Referring to FIG. 2, a target scene 210 in a real world may be observed like an observation scene 220 through a display area of an AR device. The observation scene 220 may correspond to a light attenuation state. An AR processing apparatus may generate a background image (not shown) by capturing the target scene 210 through a camera, and generate a compensation image 230 by reducing brightness of the background image using a compensation parameter. For example, if light intensity of the target scene 210 is 100%, light intensity of the observation scene 220 may be 80% and light intensity of the compensation image 230 may be 20%. Accordingly, if brightness of a first pattern 211 is 150 and brightness of a second pattern 212 is 100 in the target scene 210, brightness of a first pattern 221 may be 30 and brightness of a second pattern 222 may be 20 in the compensation image 230. When the compensation image 230 is displayed in the display area, a scene similar to the target scene 210 may be observed.

The AR processing apparatus may generate a virtual object image 240 to be overlaid on the target scene. The virtual object image 240 may include an object element 241 and a shadow element 242. The shadow element 242 may correspond to an attenuation area that expresses dark colors using the light attenuation. Accordingly, the shadow element 242 may be expressed with at least a part of the light attenuation caused by the display area remaining therein. The AR processing apparatus may generate a display image 250 by synthesizing the compensation image 230 and the virtual object image 240. The AR processing apparatus may display the display image 250 in the display area. As the light attenuation is compensated for by the display image 250, an observation scene 260 may be observed through the display area.

Figure 3:
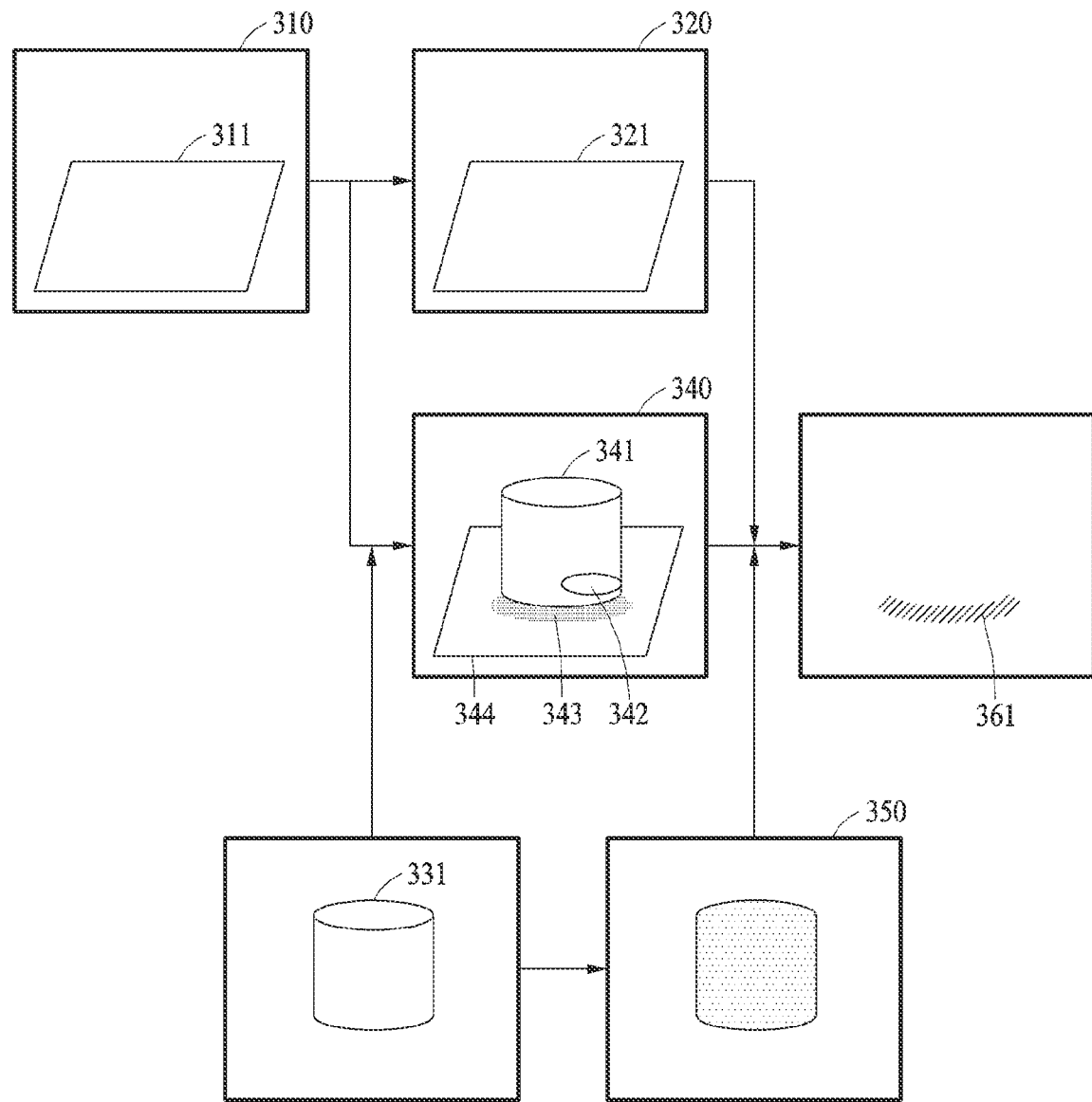
FIGS. 3 to 5 illustrate examples of deriving a virtual object image.
Figure 4:
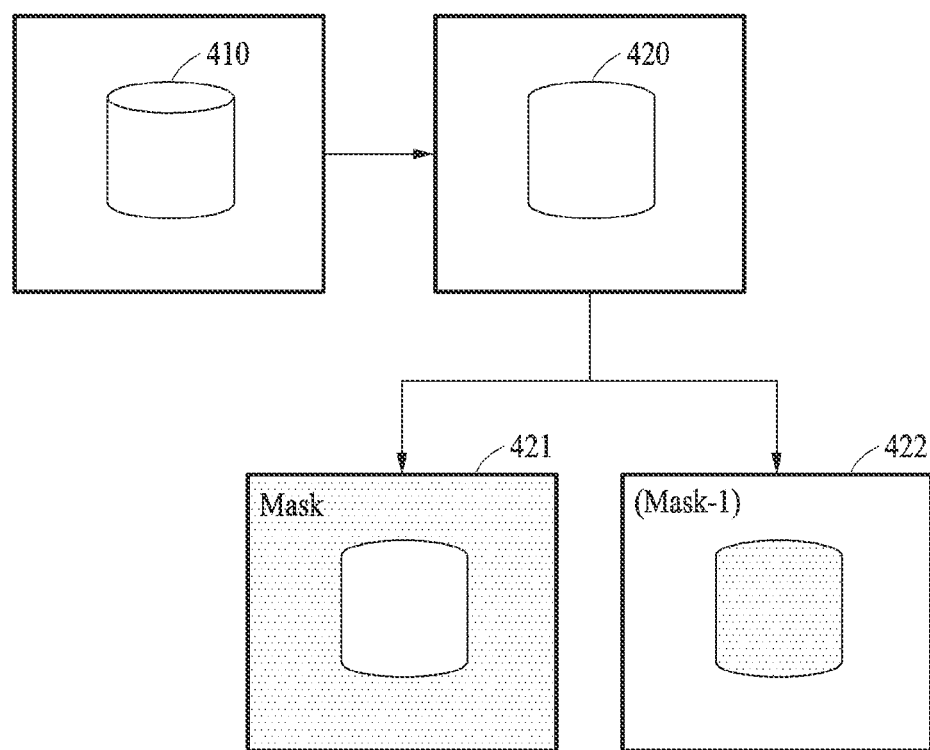
Figure 5:
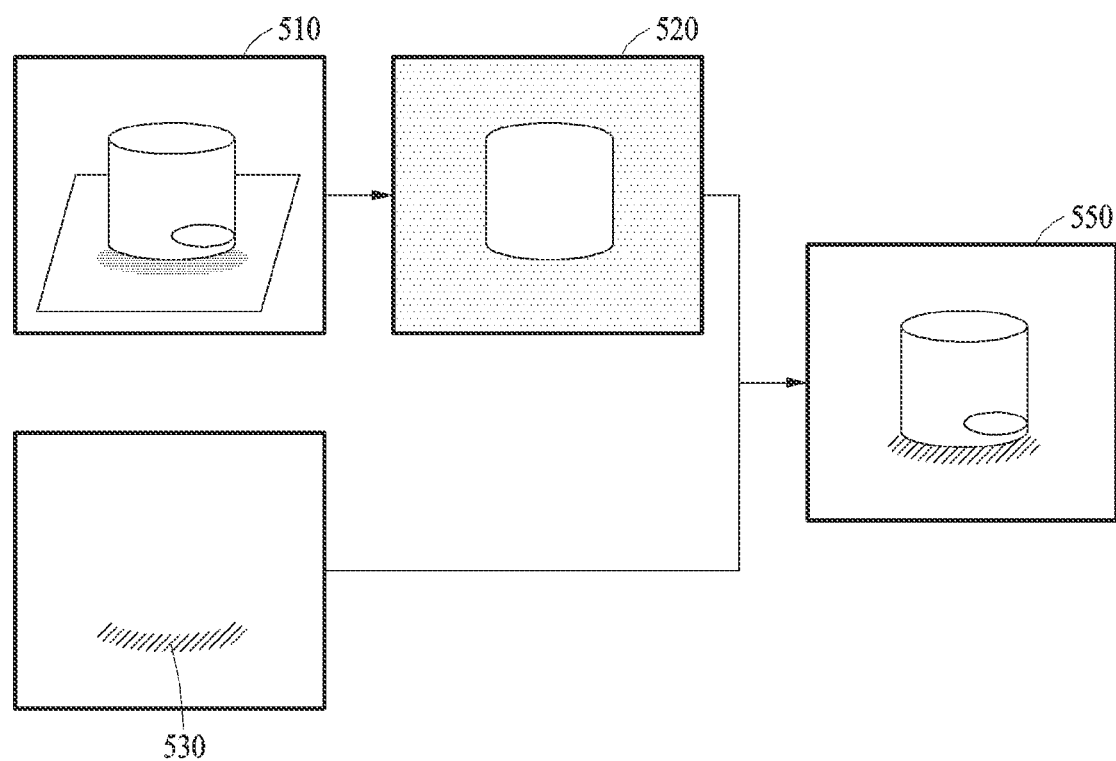

FIGS. 3 to 5 illustrates examples of deriving a virtual object image. Referring to FIG. 3, a target scene 310 may include a real object 311. An AR processing apparatus may generate a background image 320 without light attenuation by capturing the target scene 310. The background image 320 may include a real object 321. The AR processing apparatus may determine an initial virtual object element 331 and generate an object element of a virtual object image by fusing the background image 320 and the initial virtual object element 331.

The AR processing apparatus may render an intermediate result image 340 considering both the background image 320 and the initial virtual object element 331. The intermediate result image 340 may include a real object 344 and an initial virtual object element 341. The intermediate result image 340 may include a lighting effect such as a shadow effect, a reflection effect, and an interreflection effect. For example, the intermediate result image 340 may include an initial shadow element 343 of the initial virtual object element 341 and an interreflection element 342 between the initial virtual object element 341 and the real object 344.

The AR processing apparatus may generate a difference image (not shown) corresponding to a difference between the background image 320 and the intermediate result image 340, and apply a mask image 350 to the difference image to extract a shadow element 361 from the difference image. The mask image 350 may extract a portion corresponding to an outer area of the mask from the difference image. The AR processing apparatus may generate the difference image by removing the background image 320 from the intermediate result image 340. Accordingly, the shadow element 361 may have a negative value. When the shadow element 361 applies to the compensation image, a compensation value of the compensation image may be subtracted by the negative value of the shadow element 361. Accordingly, an attenuation area may be formed.

FIG. 4 illustrates an example of deriving a mask image. Referring to FIG. 4, an AR processing apparatus may generate a mask 420 that corresponds to an initial virtual object element 410 and generate mask images 421 and 422 that include the mask 420. The mask image 421 may extract a portion corresponding to an inner area of the mask 420 from an input image, and the mask image 422 may extract a portion corresponding to an outer area of the mask 420 from the input image. The mask image 421 may be expressed as Mask, and the mask image 422 may be expressed as Mask-1. The mask image 350 of FIG. 3 may correspond to the mask image 422.

Referring to FIG. 5, an AR processing apparatus may extract an object element from an intermediate result image 510 using a mask image 520. The mask image 520 may extract a portion corresponding to an inner area of the mask from the intermediate result image 510. The mask image 520 may correspond to the mask image 421 of FIG. 4. The AR processing apparatus may generate a virtual object image 550 by combining the object element and a shadow element 530. The shadow element 530 may correspond to the shadow element 361 of FIG. 3. The virtual object image 550 may include a lighting effect. The lighting effect may improve realism of the virtual object image 550. In an example, a shadow element of the virtual object image 550 may express dark colors through an attenuation area.

Figure 6:
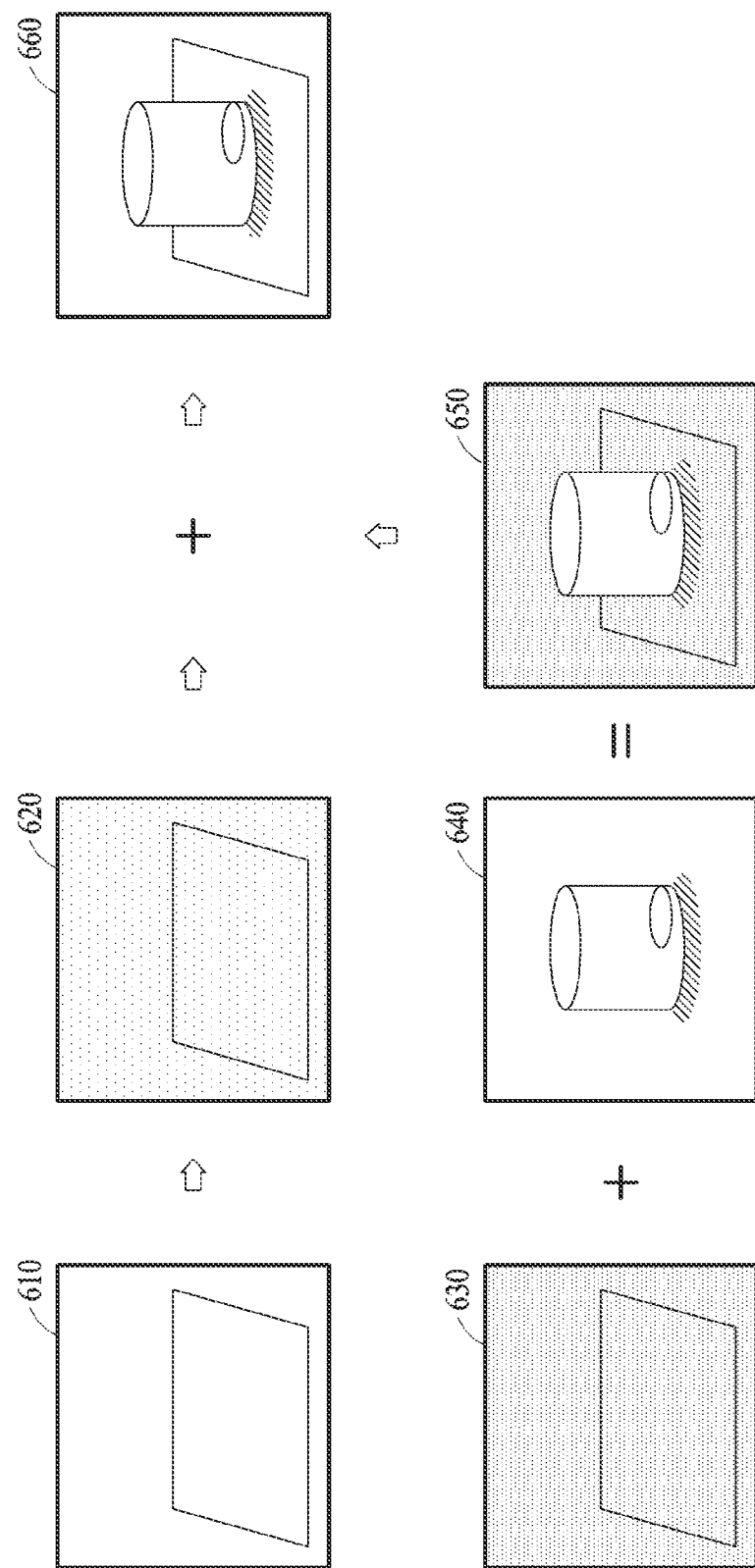
FIG. 6 illustrates an example of generating and applying a display image using the virtual object image derived by the examples of FIGS. 3 to 5.

FIG. 6 illustrates an example of generating and applying a display image using the virtual object image of FIG. 5. Referring to FIG. 6, a target scene 610 in a real world may be observed like an observation scene 620 through a display area of an AR device. The observation scene 620 may correspond to a light attenuation state. An AR processing apparatus may generate a background image (not shown) by capturing the target scene 610 through a camera and generate a compensation image 630 by reducing brightness of the background image using a compensation parameter.

The AR processing apparatus may generate a virtual object image 640 to be overlaid on the target scene. The virtual object image 640 may include, in addition to an object element, a lighting effect such as an interreflection element and a shadow element of the object element. The AR processing apparatus may generate a display image 650 by synthesizing the compensation image 630 and the virtual object image 640. An attenuation area (e.g., a shadow element) of the virtual object image 640 may have a negative value. The AR processing apparatus may determine a corresponding area of the attenuation area of the virtual object image 640 in the compensation image 630, and express the corresponding area by subtracting a pixel value of the corresponding area based on a pixel value of the attenuation area. When a compensation value of the corresponding area is "0", a darkest color may be expressed in the corresponding area.

The AR processing apparatus may display the display image 650 in the display area. The light attenuation may be compensated for by the display image 650, and an observation scene 660 may be observed through the display area. In this example, the compensation for light attenuation may be lesser or none at all for a portion of the observation scene 660 corresponding to the attenuation area of the display image 650, and as at least of a part of the light attenuation caused by the display area remains in the corresponding portion, dark colors may be expressed therein.

Figure 7:
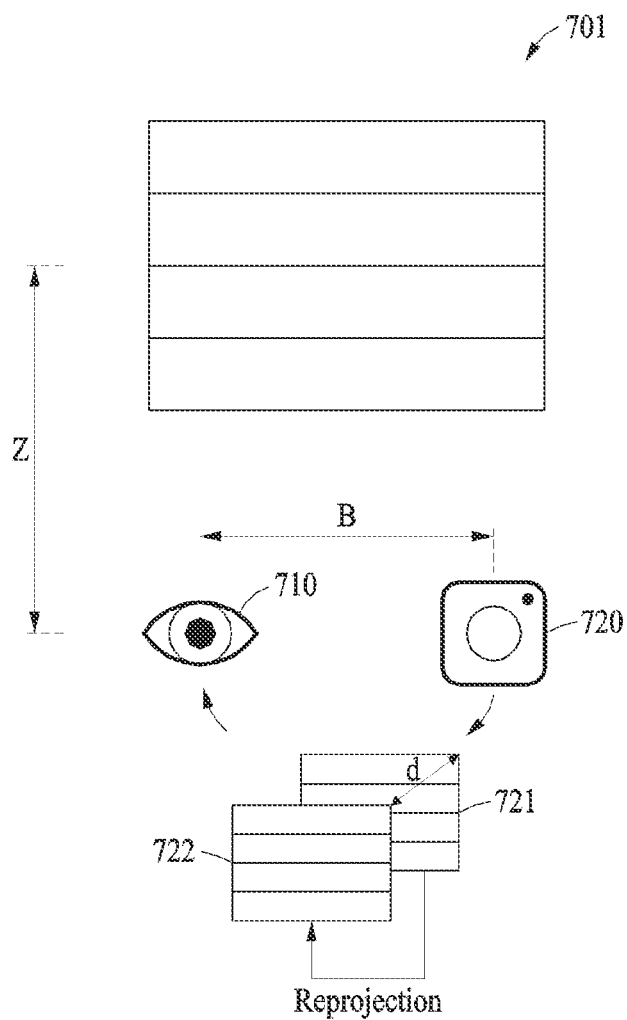
FIG. 7 illustrates an example of adjusting a compensation image to match the compensation image and a target scene.

FIG. 7 illustrates an example of adjusting a compensation image to match the compensation image and a target scene. An AR processing apparatus may express a compensation image without considering a 3D characteristic or improve a naturalness of a compensation effect by performing scene matching. As the compensation image that corresponds to the target scene in a real world is well matched to the target scene in a display image, the compensation effect may appear more natural. For example, in FIG. 2, when the first pattern 221 of the background image 230 is overlaid on the first pattern 211 of the target scene 210, and the second pattern 222 of the background image 230 is overlaid on the second pattern 212 of the target scene 210, the compensation effect may appear naturally.

The AR processing apparatus may determine a target depth Z from an AR device to a target area 701 of the compensation image, determine calibration information based on a difference between a capture viewpoint 720 of a camera and an observation viewpoint 710 of a user, and determine conversion information that converts an image 721 at the capture viewpoint 720 related to the target area 701 to an image 722 at the observation viewpoint 710 based on the target depth Z and the calibration information. For example, the calibration information may include information about a baseline B. The calibration information may be generated through a calibration process performed when the AR device is initially used. The conversion information may include disparity information between matching pairs of the images 721 and 722.

The AR processing apparatus may determine depth information in various ways. According to an example, the AR processing apparatus may obtain object position information of a virtual object image to be displayed in the target scene, and determine the target depth based on the object position information. In an example, an object display position of the virtual object image may be already determined at a time of rendering the display image. The object display position may determine a position in the real world, and the depth information may be determined through the object display position. For example, when the object display position is three meters away from the AR processing apparatus, the conversion information may be generated based on depth information of three meters.

According to another example, the AR processing apparatus may determine target plane information by estimating a target plane corresponding to the target area, and determine the target depth based on the target plane information. The AR processing apparatus may perform plane estimation based on the compensation image, and determine plane information of at least one plane in the compensation image. The depth information may be determined through the plane information. If a plurality of planes is estimated from the compensation image, the AR processing apparatus may determine the conversion information only for a part of the plurality of planes related to the virtual object, and perform reprojection only for the corresponding part.

According to another example, the AR processing apparatus may determine target space information by estimating space information corresponding to the target area, and determine the target depth based on the target space information. The AR processing apparatus may estimate sparse map points using a space estimation technique such as, for example, simultaneous localization and mapping (SLAM), and perform interpolation between the map points to estimate the space information of the target area. In another example, the AR processing apparatus may estimate the space information of the target area by estimating a volume-based space model having denser map points than SLAM.

The AR processing apparatus may adjust the compensation image using the conversion information. The AR processing apparatus may adjust the compensation image by reprojecting the image 721 to the image 722, with regard to the target area 701 of the compensation image. In an example, the reprojection may include warping.

Figure 8:
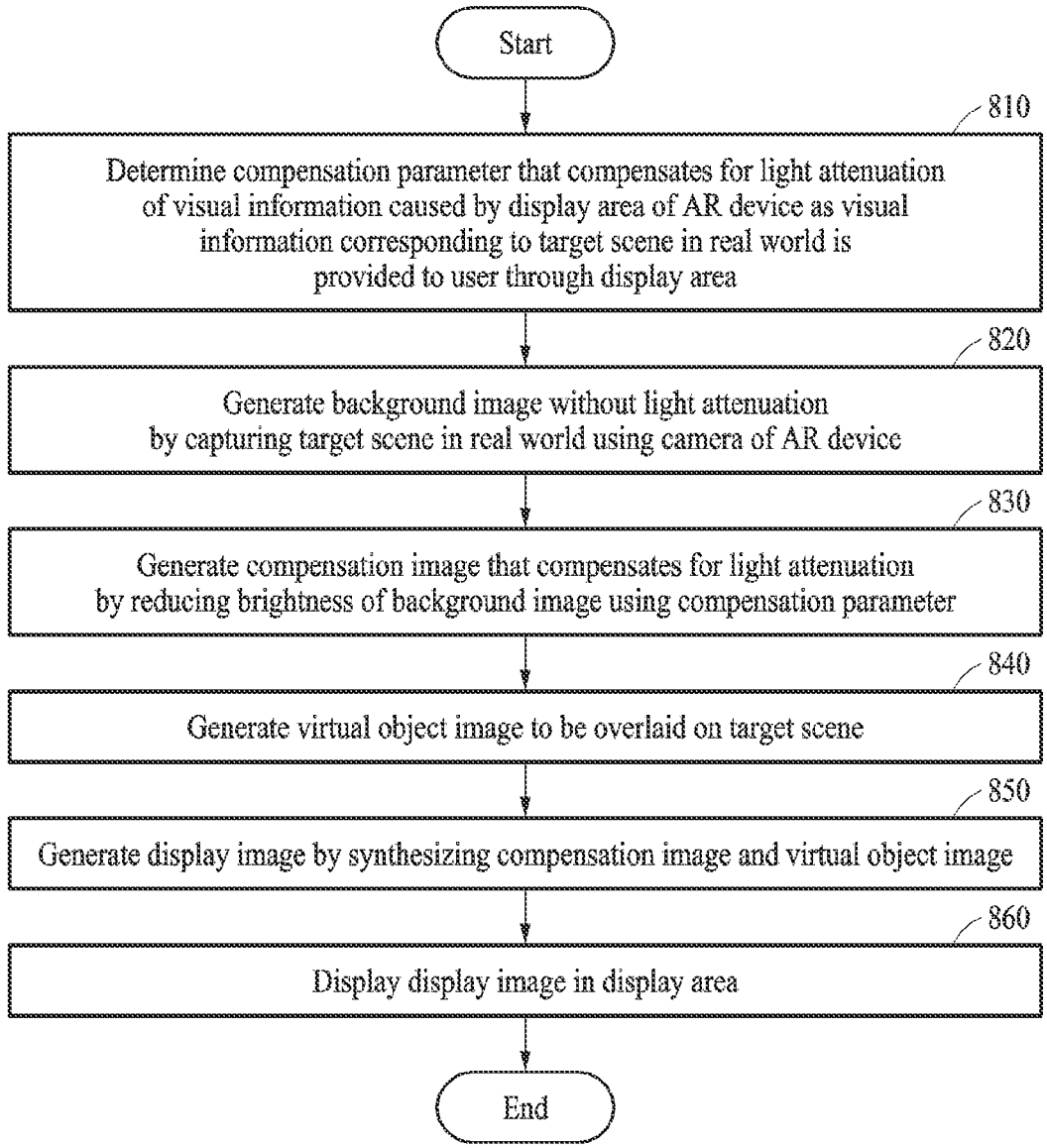
FIG. 8 illustrates an example of a method with AR processing.

FIG. 8 illustrates an example of an AR processing method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. For example, operations of the method may be performed by a computing apparatus (e.g., the AR processing apparatus 900 in FIG. 9). In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, an AR processing apparatus determines a compensation parameter that compensates for light attenuation of visual information caused by a display area of an AR device as the visual information corresponding to a target scene in a real world is provided to a user through the display area.

In operation 820, the AR processing apparatus generates a background image without the light attenuation by capturing the target scene in the real world using a camera of the AR device. In operation 830, the AR processing apparatus generates a compensation image that compensates for the light attenuation by reducing brightness of the background image using the compensation parameter.

The AR processing apparatus may adjust a compensation image so that the compensation image and the target scene are observed by the user in a matched state. The AR processing apparatus may determine a target depth from the AR device to a target area of the compensation image, determine calibration information based on a difference between a capture viewpoint of a camera and an observation viewpoint of the user, determine conversion information that converts an image at the capture viewpoint related to the target area to an image at the observation viewpoint based on the target depth and the calibration information, and adjust the compensation image using the conversion information.

In an example, the AR processing apparatus may obtain object position information of a virtual object image to be displayed in the target scene, and determine the target depth based on the object position information. In an example, the AR processing apparatus may determine target plane information by estimating a target plane corresponding to the target area, and determine the target depth based on the target plane information. In an example, the AR processing apparatus may determine target space information by estimating space information corresponding to the target area, and determine the target depth based on the target space information.

In operation 840, the AR processing apparatus generates a virtual object image to be overlaid on the target scene. The virtual object image may include an attenuation area that expresses dark colors using the light attenuation. The attenuation area of the virtual object image may be expressed with at least a part of the light attenuation caused by the display area remaining therein. For example, the attenuation area of the virtual object image may include a shadow element of the virtual object image.

The virtual object image may include an object element and the shadow element. The AR processing apparatus may generate the object element by fusing a background image and an initial virtual object element, generate the shadow element based on a difference between the background image and an intermediate result image, and generate the virtual object image by combining the object element and the shadow element.

The AR processing apparatus may generate a mask image that includes a mask corresponding to the initial virtual object element. The AR processing apparatus may generate the intermediate result image that includes the object element by fusing the background image and the initial virtual object element, and extract the object element from the intermediate result image using an inner area of the mask in the mask image. The AR processing apparatus may generate a difference image corresponding to the difference between the background image and the intermediate result image, and extract the shadow element from the difference image using an outer area of the mask in the mask image.

In operation 850, the AR processing apparatus generates a display image by synthesizing the compensation image and the virtual object image. The AR processing apparatus may determine a corresponding area of the attenuation area of the virtual object image in the compensation image. The AR processing apparatus may express the corresponding area by subtracting a pixel value of the corresponding area based on a pixel value of the attenuation area. The AR processing apparatus may express a darkest color among the dark colors by reducing a compensation value of the corresponding area to "0".

In operation 860, the AR processing apparatus displays the display image in the display area.

Figure 9:
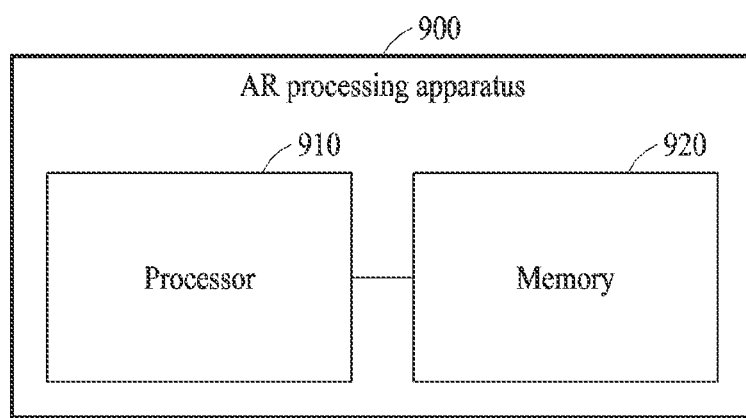
FIG. 9 illustrates an example of a configuration of an apparatus with AR processing.

FIG. 9 illustrates an example of a configuration of an apparatus with AR processing. Referring to FIG. 9, an AR processing apparatus 900 includes a processor 910 and a memory 920. The memory 920 may be connected to the processor 910 and store computer-readable instructions executable by the processor 910, data to be computed by the processor 910, or data processed by the processor 910. The memory 920 may include any one or any combination of a volatile memory and a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 920 is provided below.

The processor 910 may execute instructions to perform the operations described herein with reference to FIGS. 1 to 8, 10, and 11. For example, the processor 910 may determine a compensation parameter that compensates for light attenuation of visual information caused by a display area of an AR device as the visual information corresponding to a target scene in a real world is provided to a user through the display area, generate a background image without the light attenuation by capturing the target scene in the real world using a camera of the AR device, generate a compensation image that compensates for the light attenuation by reducing brightness of the background image using the compensation parameter, generate a virtual object image to be overlaid on the target scene, generate a display image by synthesizing the compensation image and the virtual object image, and display the display image in the display area. In addition, the description provided with reference to FIGS. 1 to 8, 10, and 11 may apply to the AR processing apparatus 900.

The processor 910 may be a data processing device implemented by hardware including a circuit having a physical structure to perform desired operations. For example, the desired operations may include code or instructions included in a program.

The hardware-implemented data processing device may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 910 is provided below.

Figure 10:
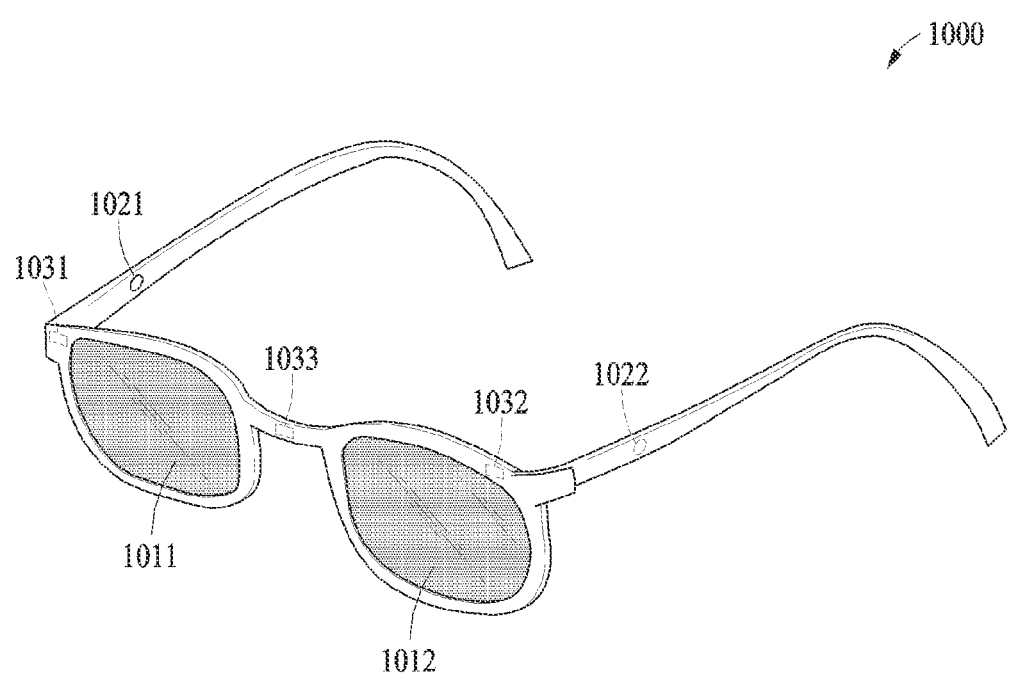
FIG. 10 illustrates an example of an AR device.

FIG. 10 illustrates an example of an AR device. Referring to FIG. 10, an AR device 1000 may generate a background image using a mono camera 1033 disposed in the bridge of the AR device 1000 and/or a stereo camera 1031, 1032 disposed in respective end piece of the AR device 1000, and provide a display image through a display area 1011, 1012. The display area 1011, 1012 may be a translucent lens that provides the display image through a reflection function, or a translucent display that displays the display image through a display element. When the display area 1011, 1012 is the translucent lens, the display image may be projected to the display area 1011, 1012 through a projector 1021, 1022 disposed in each of the temples of the AR device. The AR device 1000 may further include, in addition to the components explicitly shown in FIG. 10, one or more of the components that are described for the AR processing apparatus 900 of FIG. 9 and an electronic device 1100 of FIG. 11.

Figure 11:
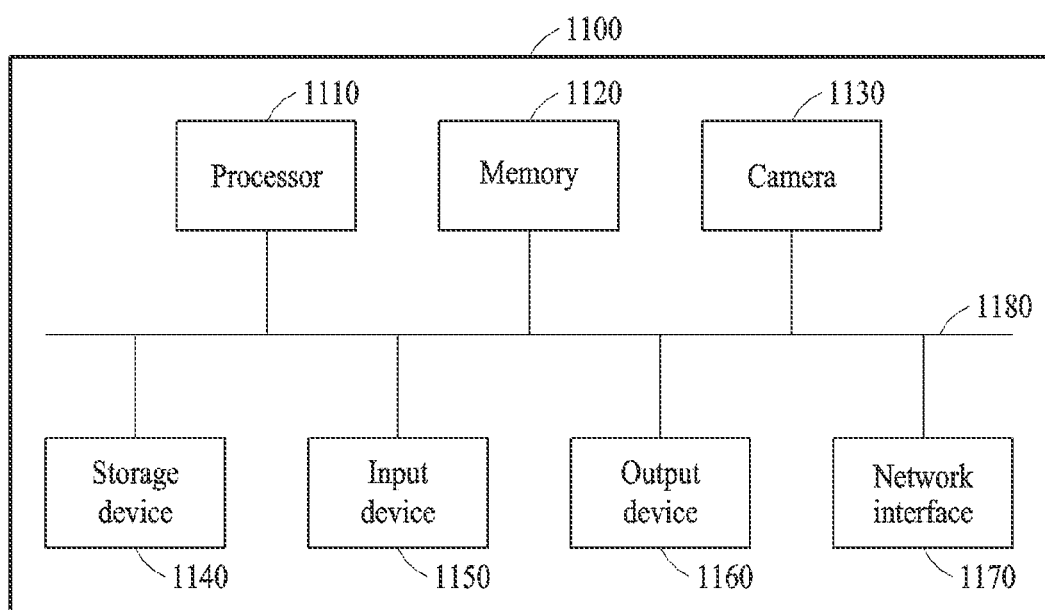
FIG. 11 illustrates an example of an electronic device with AR processing.

FIG. 11 illustrates an example of a configuration of an electronic device with AR processing. Referring to FIG. 11, an electronic device 1100 may include a processor 1110, a memory 1120, a camera 1130, a storage device 1140, an input device 1150, an output device 1160, and a network interface 1170. The components of the electronic device 1100 may communicate with each other through a communication bus 1180. For example, the electronic device 1100 may be implemented as at least a part of, for example, a mobile device such as a mobile phone, a smart phone, a personal digital assistant (PDA), a netbook, a tablet computer, a laptop computer, and the like, a wearable device such as a smart watch, a smart band, smart glasses (e.g., AR glasses, AR goggles, and an AR HMD), and the like, a home appliance such as a television (TV), a smart TV, a refrigerator, a smart refrigerator, and the like, a security device such as a door lock, a security kiosk, and the like, and a vehicle such as an autonomous vehicle, a smart vehicles, and the like. The electronic device 1100 may structurally and/or functionally include the AR processing apparatus 900.

The processor 1110 executes instructions or functions to be executed in the electronic device 1100. For example, the processor 1110 may process the instructions stored in the memory 1120 or the storage device 1140. The processor 1110 may perform the one or more operations described through FIGS. 1 to 10. In addition to the description of processor 1110 herein, the descriptions of processor 910 from FIG. 9 is also applicable to FIG. 11, and are incorporated herein by reference. Thus, the above description may not be repeated here. The memory 1120 may include a computer-readable storage medium or a computer-readable storage device. The memory 1120 may store instructions to be executed by the processor 1110 and store related information while the instructions and/or an application are executed by the electronic device 1100. In addition to the description of memory 1120 herein, the descriptions of memory 920 from FIG. 9 is also applicable to FIG. 11, and are incorporated herein by reference. Thus, the above description may not be repeated here.

The camera 1130 may capture a photo and/or a video. The storage device 1140 includes a computer-readable storage medium or computer-readable storage device. The storage device 1140 may store a more quantity of information than the memory 1120 for a long time. For example, the storage device 1140 may include a magnetic hard disk, an optical disc, a flash memory, a floppy disk, or other non-volatile memories.

The input device 1150 may receive an input from the user in traditional input manners through a keyboard and a mouse, and in new input manners such as a touch input, a voice input, a gesture, a motion-based input, and an image input. For example, the input device 1150 may include a keyboard, a mouse, a touch screen, a microphone, or any other device that detects the input from the user and transmits the detected input to the electronic device 1100. The output device 1160 may provide an output of the electronic device 1100 to the user through a visual, auditory, or haptic channel. The output device 1160 may include, for example, a display, a touch screen, a speaker, a vibration generator, or any other device that provides the output to the user. The network interface 1170 may communicate with an external device through a wired or wireless network.

The AR processing apparatus 900, electronic device 1100, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the augmented reality (AR) processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with augmented reality (AR) processing, the method comprising:
    determining a compensation parameter to compensate for light attenuation caused by a display area of an AR device, the AR device configured to capture images including a target scene and to display the target scene in a display image of the display area;
    generating a compensation image from the target scene by using the compensation parameter, wherein the compensation image compensates for the light attenuation caused by the display area, wherein the generating of the compensation image comprises:
        generating a background image without the light attenuation; and
        generating the compensation image by reducing brightness of the background image using the compensation parameter;
    applying the compensation image to the display image of the display area; and
    displaying the display image in the display area.

2. The method of claim 1, wherein the light attenuation occurs as visual information corresponding to the target scene being displayed through the display area.

3. The method of claim 1, wherein the applying the compensation image to the display image comprises generating the display image by synthesizing a virtual object image to be overlaid on a target scene with the compensation image.

4. The method of claim 3, wherein the virtual object image comprises an attenuation area that expresses dark colors using the light attenuation.

5. The method of claim 4, wherein the attenuation area of the virtual object image is expressed with at least a part of the light attenuation caused by the display area remaining therein.

6. The method of claim 4, wherein the attenuation area of the virtual object image comprises any one or any combination of a shadow, a black pupil, and black hair in the virtual object image.

7. The method of claim 4, wherein the generating of the display image comprises:
    determining a corresponding area of the attenuation area of the virtual object image in the compensation image; and
    expressing the corresponding area by subtracting a pixel value of the corresponding area based on a pixel value of the attenuation area.

8. The method of claim 7, wherein the expressing of the corresponding area comprises expressing a darkest color among the dark colors by reducing a compensation value of the corresponding area to "0".

9. The method of claim 4, wherein the virtual object image comprises an object element and a shadow element, and
wherein the generating of the virtual object image comprises:
generating the object element by fusing a background image without the light attenuation and an initial virtual object element;
generating the shadow element based on a difference between the background image and an intermediate result image; and
generating the virtual object image by fusing the object element and the shadow element.

10. The method of claim 9, wherein the generating of the virtual object image further comprises:
generating a mask image comprising a mask corresponding to the initial virtual object element, and
wherein the generating of the object element comprises:
generating the intermediate result image comprising the object element by fusing the background image and the initial virtual object element; and
extracting the object element from the intermediate result image using an inner area of the mask in the mask image.

11. The method of claim 9, wherein the generating of the virtual object image further comprises:
generating a mask image comprising a mask corresponding to the initial virtual object element, and
wherein the generating of the shadow element comprises:
generating a difference image corresponding to a difference between the background image and the intermediate result image; and
extracting the shadow element from the difference image using an outer area of the mask in the mask image.

12. The method of claim 1, further comprising:
adjusting the compensation image so that the compensation image and a target scene are observed in a matched state.

13. The method of claim 12, wherein the adjusting of the compensation image comprises:
determining a target depth from the AR device to a target area of the compensation image;
determining calibration information based on a difference between a capture viewpoint of a camera configured to capture the target scene and an observation viewpoint of an user;
determining conversion information to convert an image at the capture viewpoint for the target area into an image at the observation viewpoint based on the target depth and the calibration information; and
adjusting the compensation image using the conversion information.

14. The method of claim 13, wherein the determining of the target depth comprises:
obtaining object position information of a virtual object image to be displayed in the target scene; and
determining the targe depth based on the object position information.

15. The method of claim 13, wherein the determining of the target depth further comprises:
determining target plane information by estimating a target plane corresponding to the target area; and
determining the target depth based on the target plane information.

16. The method of claim 13, wherein the determining of the target depth further comprises:
determining target space information by estimating space information corresponding to the target area; and
determining the target depth based on the target space information.

17. A non-transitory computer-readable storage medium storing instructions that, when executed by a processor, cause the processor to perform the AR processing method of claim 1.

18. An augmented reality (AR) processing apparatus, comprising:
one or more processors; and
a memory storing instructions configured to cause the one or more processors to:
determine a compensation parameter to compensate for light attenuation caused by a display area of an AR device;
generate a compensation image by using the compensation parameter, wherein the generating of the compensation image comprises:
generating a background image without the light attenuation; and
generating the compensation image by reducing brightness of the background image using the compensation parameter;
apply the compensation image to a display image of the display area; and
display the display image in the display area.

19. An augmented reality (AR) device, comprising:
an image capture device configured to receive images of a target scene;
a display configured to display a display image in a display area of the display, the display image including the images of the target scene;
one or more processors configured to:
determine a compensation parameter to compensate for light attenuation caused by the display area;
generate a compensation image from the target scene by using the compensation parameter, wherein the generating of the compensation image comprises:
generating a background image without the light attenuation; and
generating the compensation image by reducing brightness of the background image using the compensation parameter; and
apply the compensation image to the display image,
wherein the applying the compensation image to the display image comprises generating the display image by synthesizing a virtual object image to be overlaid on the target scene with the compensation image.

* * * * *